(12) United States Patent
Thomson et al.

(10) Patent No.: US 8,904,399 B2
(45) Date of Patent: Dec. 2, 2014

(54) SYSTEM AND METHOD OF EXECUTING THREADS AT A PROCESSOR

(75) Inventors: Steven S. Thomson, San Diego, CA (US); Paul R. Johnson, San Diego, CA (US); Chirag D. Shah, San Diego, CA (US); Ryan C. Michel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 12/964,342

(22) Filed: Dec. 9, 2010

(65) Prior Publication Data

US 2011/0225590 A1  Sep. 15, 2011

Related U.S. Application Data

(60) Provisional application No. 61/314,085, filed on Mar. 15, 2010.

(51) Int. Cl.
  *G06F 9/46* (2006.01)
  *G06F 9/48* (2006.01)

(52) U.S. Cl.
  CPC .................................. *G06F 9/4881* (2013.01)
  USPC .......................................................... 718/103

(58) Field of Classification Search
  None
  See application file for complete search history.

(56) References Cited

U.S. PATENT DOCUMENTS

| | | | | |
|---|---|---|---|---|
| 5,812,844 A | * | 9/1998 | Jones et al. | 718/104 |
| 5,826,081 A | * | 10/1998 | Zolnowsky | 718/103 |
| 6,182,120 B1 | | 1/2001 | Beaulieu et al. | |
| 7,080,379 B2 | | 7/2006 | Brenner et al. | |
| 7,487,503 B2 | | 2/2009 | Accapadi et al. | |
| 7,506,339 B2 | | 3/2009 | Buch | |
| 7,802,256 B2 | | 9/2010 | Havens | |
| 2001/0056456 A1 | | 12/2001 | Cota-Robles | |
| 2003/0037117 A1 | * | 2/2003 | Tabuchi | 709/207 |
| 2005/0076337 A1 | | 4/2005 | Mangan | |
| 2005/0149937 A1 | * | 7/2005 | Pilkington | 718/102 |
| 2006/0117300 A1 | * | 6/2006 | Puthukattukaran et al. | 717/124 |
| 2006/0294522 A1 | | 12/2006 | Havens | |
| 2009/0210879 A1 | | 8/2009 | Kaiser et al. | |

FOREIGN PATENT DOCUMENTS

| | | |
|---|---|---|
| EP | 0915418 A2 | 5/1999 |
| EP | 1544738 A1 | 6/2005 |
| JP | H11212809 A | 8/1999 |

OTHER PUBLICATIONS

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.
International Search Report and Written Opinion—PCT/US2011/025890—ISA/EPO—Jun. 7, 2011.

* cited by examiner

*Primary Examiner* — Emerson Puente
*Assistant Examiner* — Sisley Kim
(74) *Attorney, Agent, or Firm* — Nicholas A. Cole

(57) ABSTRACT

A method and system for executing a plurality of threads are described. The method may include mapping a thread specified priority value associated with a dormant thread to a thread quantized priority value associated with the dormant thread if the dormant thread becomes ready to run. The method may further include adding the dormant thread to a ready to run queue and updating the thread quantized priority value. A thread quantum value associated with the dormant thread may also be updated, or a combination of the quantum value and quantized priority value may be both updated.

28 Claims, 10 Drawing Sheets

SYSTEM AND METHOD OF EXECUTING THREADS AT A PROCESSOR

CROSS REFERENCE TO RELATED PATENT APPLICATION AND PRIORITY CLAIM

This application claims priority under 35 U.S.C. §119(e) to U.S. Provisional Patent Application Ser. No. 61/314,085 filed on Mar. 15, 2010. The entire contents of this provisional patent application are hereby incorporated by reference.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the number of operation threads increases. Further, as the number of operation threads increase, the ability to effectively manage the execution of the threads becomes increasingly difficult.

Accordingly, what is needed is an improved system and method of executing a plurality of threads on one or more processors.

SUMMARY

A method and system for executing a plurality of threads includes mapping a thread specified priority value associated with a dormant thread to a thread quantized priority value associated with the dormant thread if the dormant thread becomes ready to run. This mapping includes assigning the dormant thread a bucket priority value. The dormant thread is then added to a ready to run queue. Then, the thread quantized priority value, a thread quantum value, or a combination thereof associated with the dormant thread may be updated. This updating may comprise one of statically updating using a map and dynamically updating based on a bucket priority value assigned to the thread.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
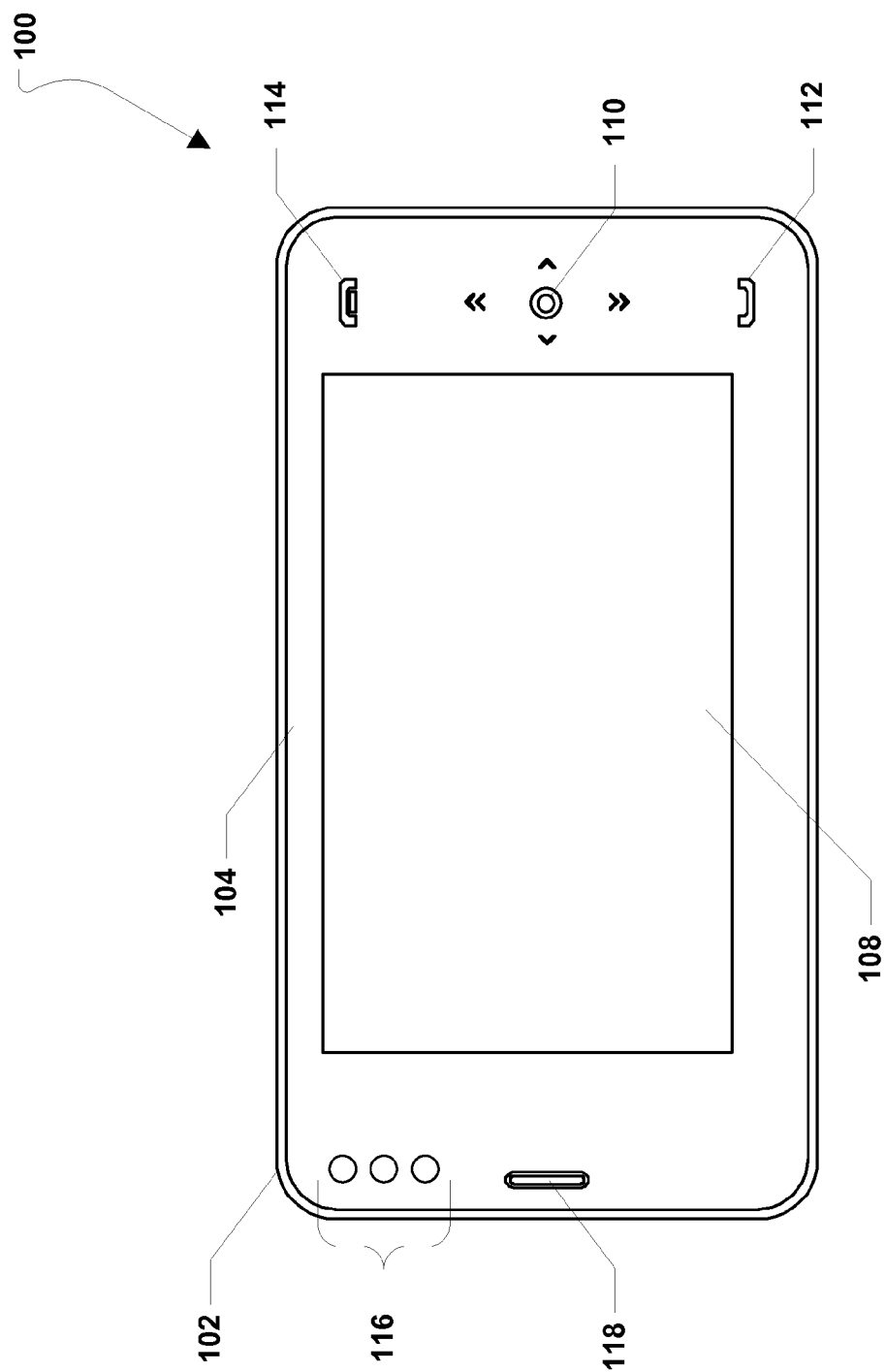
FIG. 1 is a front plan view of a first aspect of a portable computing device (PCD) in a closed position.
Figure 2:
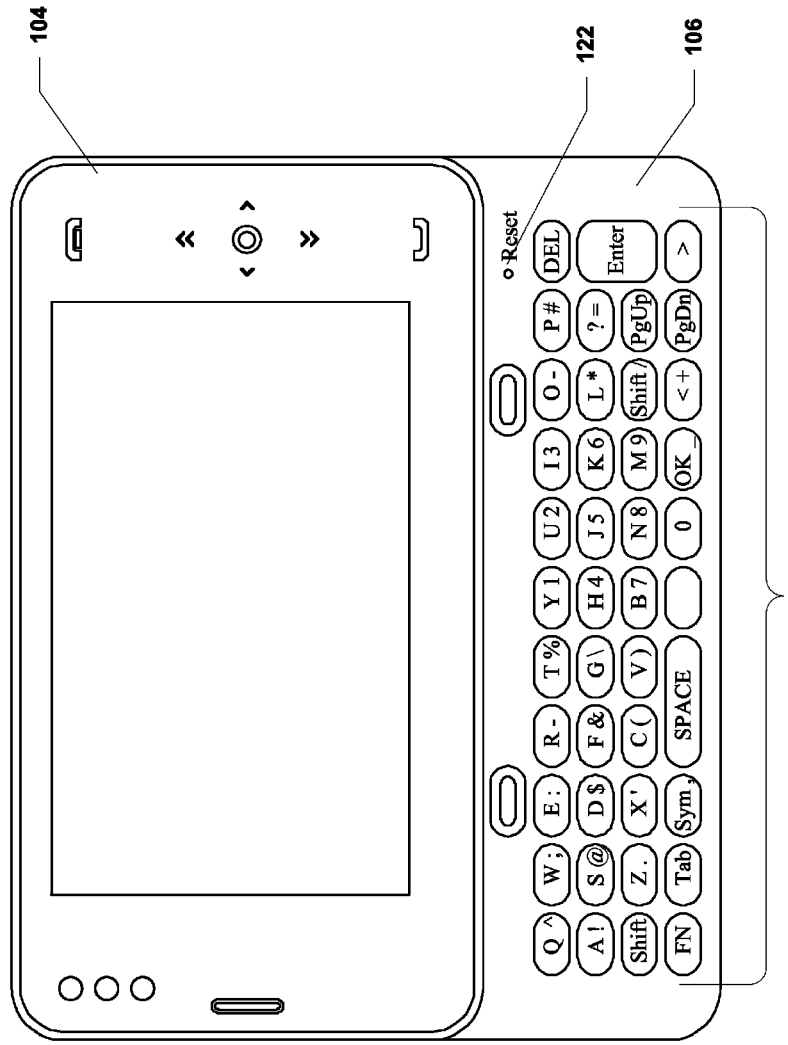
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard.

The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
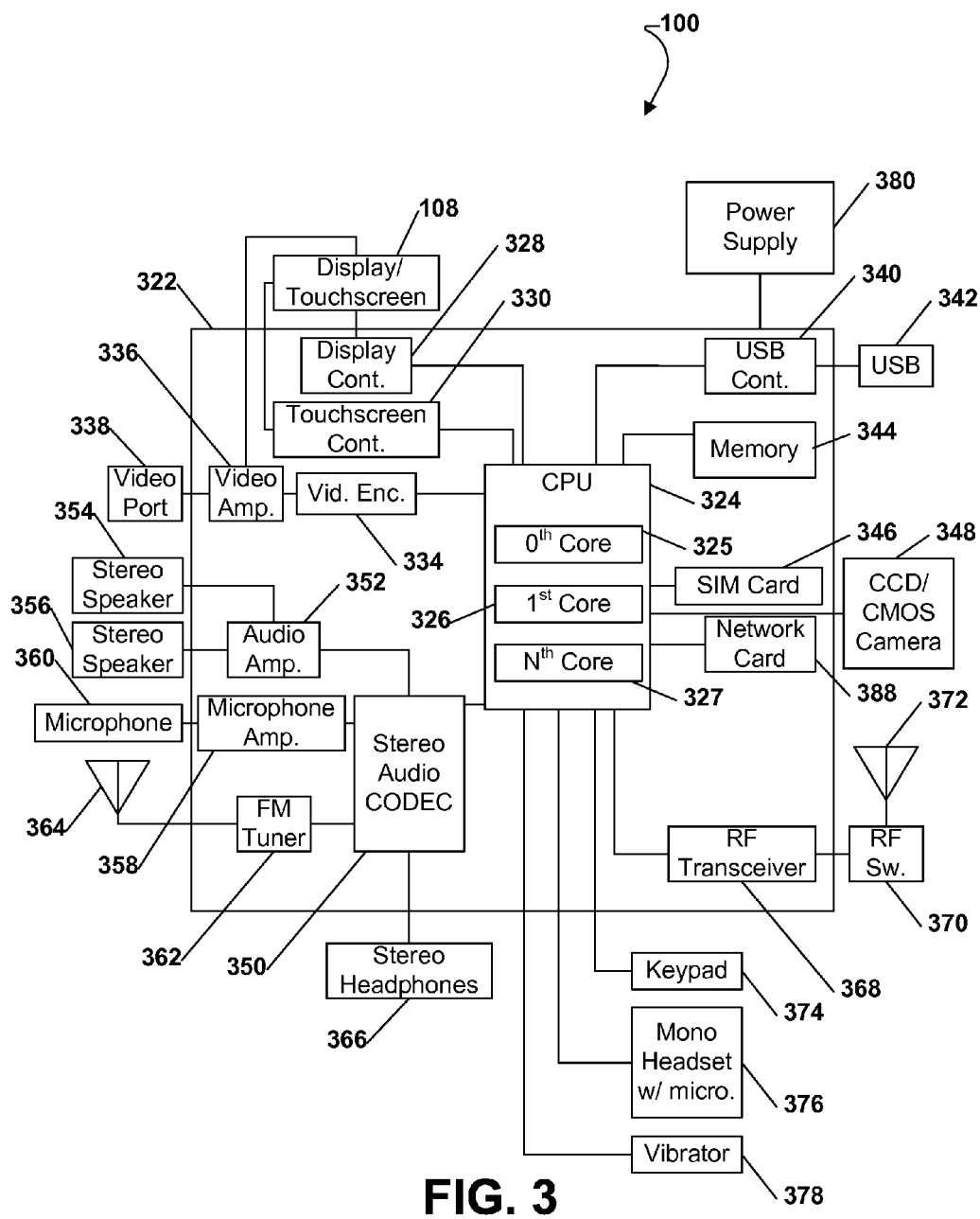
FIG. 3 is a block diagram of a second aspect of a PCD.

Referring to FIG. 3, an exemplary, non-limiting aspect of a portable computing device (PCD) is shown and is generally designated 100. As shown, the PCD 100 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touch screen 108 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system (s) committee (NTSC) encoder, is coupled to the multicore CPU 324. Further, a video amplifier 331 is coupled to the video encoder 334 and the display/touch screen 108. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 3 further indicates that the PCD 100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touch screen 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or any combination thereof may serve as a means for executing one or more of the method steps described herein in order to execute a plurality of tasks or threads. The multicore CPU 324, the memory 344, or any combination thereof may also serve as a means for executing one or more of the method steps described herein in order to statically update a thread priority quantization, a thread quantum value, or a combination thereof. Additionally, the multicore CPU 324, the memory 344, or any combination thereof may serve as a means for executing one or more of the method steps described herein in order to dynamically update a thread priority quantization, a thread quantum value, or a combination thereof. Also, the multicore CPU 324, the memory 344, or any combination thereof may serve as a means for assigning a priority to each of a plurality of threads.

Figure 4:
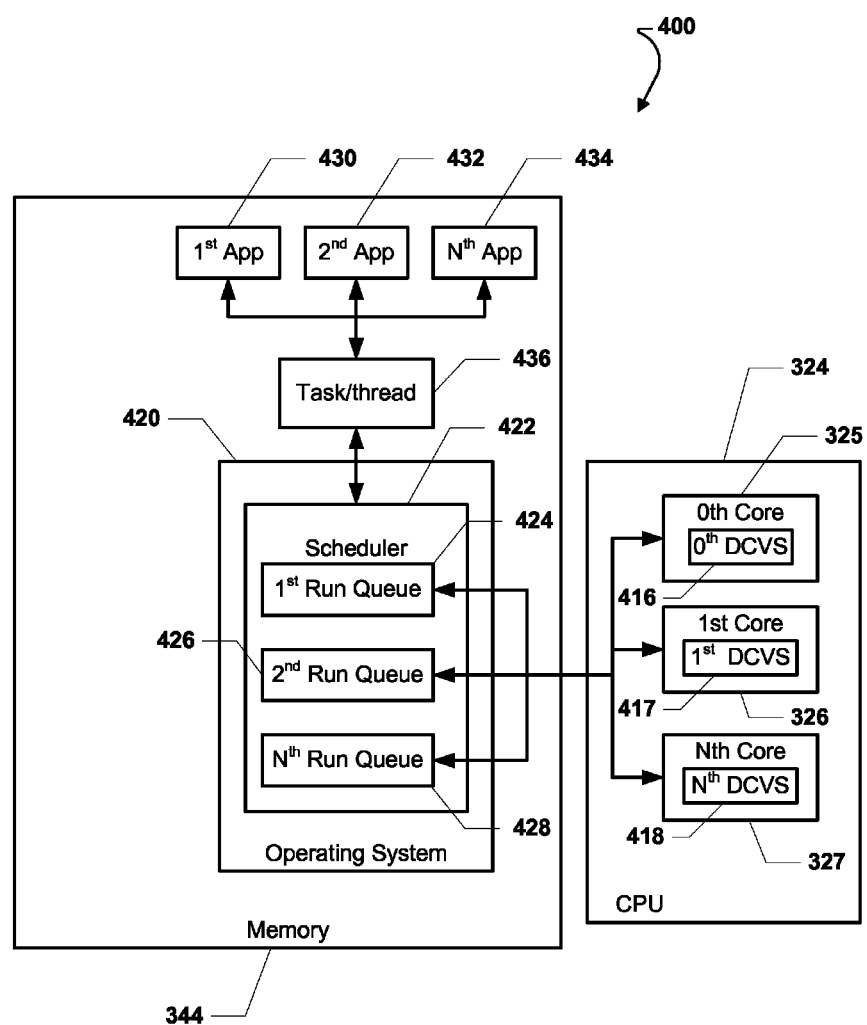
FIG. 4 is a block diagram of a processing system.

Referring to FIG. 4, a processing system is shown and is generally designated 400. In a particular aspect, the processing system 400 may be incorporated into the PCD 100 described above in conjunction with FIG. 3. As shown, the processing system 400 may include a multicore central processing unit (CPU) 324 and a memory 344 connected to the multicore CPU 324. The multicore CPU 324 may include a zeroth core 325, a first core 326, and an Nth core 327. The zeroth core 325 may include a zeroth dynamic clock and voltage scaling (DCVS) algorithm 416 executing thereon. The first core 326 may include a first DCVS algorithm 417 executing thereon. Further, the Nth core 327 may include an Nth DCVS algorithm 418 executing thereon. In a particular aspect, each DCVS algorithm 416, 417, 418 may be independently executed on a respective core 325, 326, 327.

Moreover, as illustrated, the memory 344 may include an operating system 420 stored thereon. The operating system 420 may include a scheduler 422 and the scheduler 422 may include a first run queue 424, a second run queue 426, and an Nth run queue 428. The memory 344 may also include a first application 430, a second application 432, and an Nth application 434 stored thereon.

In a particular aspect, the applications 430, 432, 434 may send one or more tasks 436 to the operating system 420 to be processed at the cores 325, 326, 327 within the multicore CPU 324. The tasks 436 may be processed, or executed, as single tasks, threads, or a combination thereof. Further, the scheduler 422 may schedule the tasks, threads, or a combination thereof for execution within the multicore CPU 324. Additionally, the scheduler 422 may place the tasks, threads, or a combination thereof in the run queues 424, 426, 428. The cores 325, 326, 327 may retrieve the tasks, threads, or a combination thereof from the run queues 424, 426, 428 as instructed, e.g., by the operating system 420 for processing, or execution, of those task and threads at the cores 325, 326, 327.

In a particular aspect, the scheduler 422, the memory 344, the cores 325, 326, 327, or any combination thereof may serve as a means for executing one or more of the method steps described herein in order to execute a plurality of tasks/threads 436. The scheduler 422, the memory 344, the cores 325, 326, 327, or any combination thereof may also serve as a means for executing one or more of the method steps described herein in order to statically update a thread priority quantization, a thread quantum value, or a combination thereof. Moreover, the scheduler 422, the memory 344, the cores 325, 326, 327, or any combination thereof may serve as a means for executing one or more of the method steps described herein in order to dynamically update a thread priority quantization, a thread quantum value, or a combination thereof. Further, the scheduler 422, the memory 344, the cores 325, 326, 327, or any combination thereof may serve as a means for assigning a priority to each of a plurality of threads.

In a particular aspect, thread priorities may be juggled, or otherwise handled, by analyzing the various threads 436 and their dependencies and assigning a priority value based on the criticality associated with the processing of each thread 436. As the number of concurrent threads increases and the number of priorities increases, the more complex it becomes to juggle the threads 436 based on the respective priorities. As described herein, each thread may have a specified priority value, a quantized priority value, and a quantum value.

The specified priority values may be expressed as relative values, e.g., high, medium, or low that correspond to the buckets 504, 506, and 508 illustrated in FIG. 5 and described in detail below. The quantum values may be expressed as time values, e.g., milliseconds. For example, a particular thread may have a quantum value of one milliseconds (1 ms), five milliseconds (5 ms), ten milliseconds (10 ms), etc.

Based on the specified priority value, the quantized priority value, and the quantum value of each thread, the threads 436 may be processed in a manner that allows relatively more critical threads 436 to be processed without starving out the less critical threads 436. Further, in situations where multiple threads are running substantially simultaneously and have substantially the same criticality, i.e., priority, the threads may handshake between each other, e.g., through the use of quantum values, in order to allow each to proceed to process without starvation of either thread.

Figure 5:
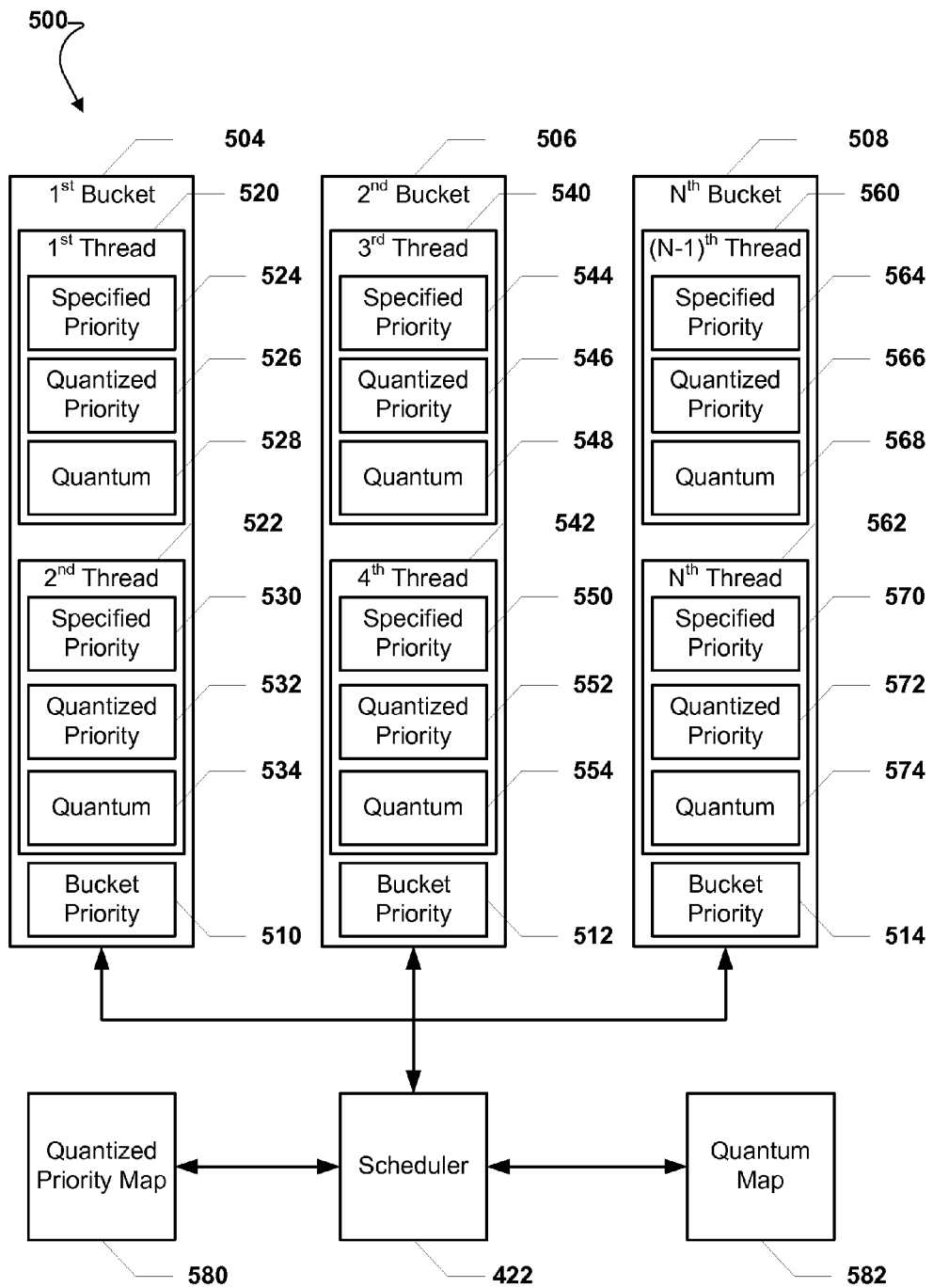
FIG. 5 is a block diagram of a prioritization system.

FIG. 5 illustrates a prioritization system that is generally designated 500. As illustrated, the quantized prioritization system 500 may include a scheduler 422. The scheduler 422 may have access to a first thread bucket 504. Further, the scheduler 422 may have access to a second thread bucket 506. As shown, the scheduler 422 may also have access to an Nth thread bucket 508. In a particular aspect, as illustrated, the scheduler 422 may have access to three thread buckets 504, 506, 508 which correspond to three priority values of high, medium, and low priority. However, it may be appreciated that the scheduler 422 may have access to four thread buckets, five thread buckets, six thread buckets, etc. that correspond to other intermediate priority values (not illustrated).

In a particular aspect, each thread bucket 504, 506, 508 may be assigned a bucket priority value 510, 512, 514. Specifically, the first thread bucket 504 may be assigned a first bucket priority value 510. The second thread bucket 506 may be assigned a second bucket priority value 512. Also, the Nth thread bucket 508 may be assigned an Nth bucket priority value 514.

In one aspect, the bucket priority values 510, 512, 514 may be relative to each other. For example, the first bucket priority value 510 may be a high bucket priority value. The second bucket priority value 512 may be an intermediate bucket priority value. Further, the third bucket priority value 514 may be a low bucket priority value. Threads, described below, may be placed in each bucket 504, 506, 508 based on a specified priority value associated with each thread. Threads with like specified priority values may be placed in the same bucket 504, 506, 508.

Still referring to FIG. 5, the first bucket 504 may include a first thread 520 and a second thread 522. The first thread 520 may include a specified priority value 524, a quantized priority value 526, and a quantum value 528. A specified priority value 524 is a priority value specified by the thread. The specified priority value is used to give priority to the execution of threads. For example, a higher priority value may cause a particular thread to be executed before a thread having a lower priority value. A quantized priority value 526 may be a priority value determined at least partially based on the run information for the thread. The quantum value 528 may be a time-slice that a thread may be allowed to run before being preempted by another thread in the same bucket. As shown, the second thread 522 may include a specified priority value 530, a quantized priority value 532, and a quantum value 534.

As shown in FIG. 5, the second bucket 506 may include a third thread 540 and a fourth thread 542. The third thread 540 may include a specified priority value 544, a quantized priority value 546, and a quantum value 548. As illustrated, the fourth thread 542 may include a specified priority value 550, a quantized priority value 552, and a quantum value 554.

The Nth bucket 508 may include a (N−1)th thread 560 and an Nth thread 562. The (N−1)th thread 560 may include a specified priority value 564, a quantized priority value 566, and a quantum value 568. As illustrated, the Nth thread 562 may include a specified priority value 570, a quantized priority value 572, and a quantum value 574.

In a particular aspect, the threads 520, 522, 540, 542, 560, 562 may be moved by the scheduler 422 between the buckets 504, 506, 508 based on the run time information associated with each thread. For example, a quantized priority value 526 associated with the first thread 520 may become lower than the bucket priority value 510 associated with the first bucket 504. If the quantized priority value 526 of the first thread 520 becomes lower than the bucket priority value 510 of the first bucket 504, the first thread 520 may be moved by the scheduler 422 from the first bucket 504 to either the second bucket 506 or the Nth bucket 508, depending on the quantized priority value 526 of the first thread 520.

As another example, the quantized priority value 546 associated with the third thread 540 may become greater than the bucket priority value 512 associated with the second bucket 506. If the quantized priority value 546 of the third thread 540 becomes greater than the bucket priority value 512 associated with the second bucket 506, the third thread 540 may be moved by the scheduler 422 from the second bucket 506 to the first bucket 504.

FIG. 5 further shows a quantized priority value map 580 and a quantum value map 582 that are accessible to the scheduler 422. The scheduler 422 may map the quantized priority value 526, 532, 546, 552, 566, 572 associated with each thread 520, 522, 540, 542, 560, 562 to the specified priority value 524, 530, 544, 550, 564, 570 of each thread 520, 522, 540, 542, 560, 562 and store each in the quantized priority value map 580 with an association to the appropriate thread 520, 522, 540, 542, 560, 562. Additionally, the scheduler 422 may map the quantum value 528, 534, 548, 554, 568, 574 associated with each thread 520, 522, 540, 542, 560, 562 to the specified priority value 524, 530, 544, 550, 564, 570 of each thread 520, 522, 540, 542, 560, 562 and store each in the quantum value map 582 with an association to the appropriate thread 520, 522, 540, 542, 560, 562. The quantized priority value map 580 lists all threads 436 based on their quantized priority values irrespective of their bucket priority assignments. Similarly, the quantum value map 582 lists all threads 436 based on their quantum values irrespective of their bucket priority assignments.

The prioritization system 500 allows the scheduler 422 to manage threads 436 within their assigned buckets 504, 506, and 508 and to reassign threads 436 to other buckets 504, 506, and 508 as priorities may shift or change during execution/run-time. This management of threads 436 within their respective assigned buckets 504, 506, and 508 during run-time may be referred to as dynamic updating of thread priorities.

Meanwhile, with the quantized priority value map 580 and quantum value map 582, the scheduler 422 may also track and update priorities among threads 436 irrespective of their individual bucket assignments and less frequently relative to the bucket assignment tracking. This tracking and updating of priorities among threads 436 based on the maps 580 and 582 irrespective of bucket assignments and less frequently relative to the bucket assignment tracking is generally referred to as static updating of thread priorities.

Figure 6:
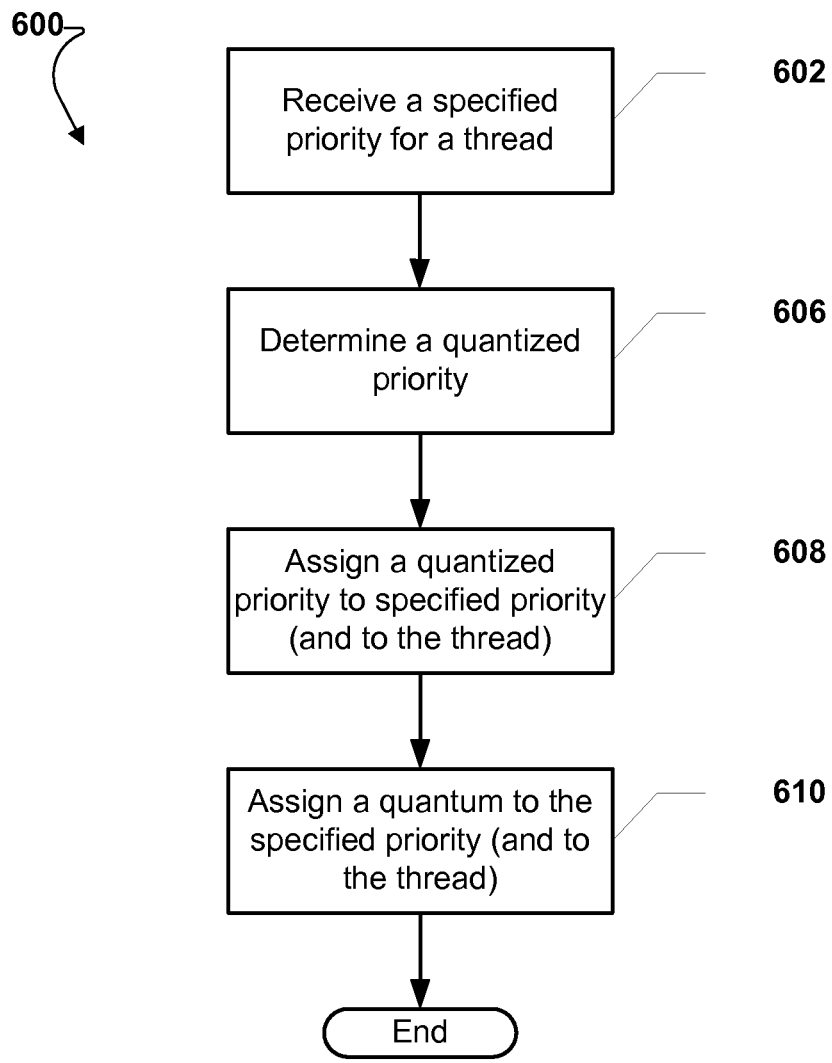
FIG. 6 is a flowchart illustrating a method of prioritizing a plurality of threads.

FIG. 6 illustrates a method for assigning a priority to each of a plurality of threads is shown and is generally designed 600. Beginning at block 602, a scheduler 422 may receive a specified priority value for a thread 602. The method 600 may proceed to block 606 and the scheduler 422 may determine a quantized priority value for the thread.

Moving to block 608, the scheduler 422 may associate a quantized priority value to the specified priority value and to the thread. Further, at block 610, the scheduler 422 may associate a quantum value to the specified priority value and to the thread. Thereafter, the method 600 may end.

During operation, the scheduler 422 may utilize the specified priority value, the quantized priority value, and the quantum value for each thread to control the processing of each thread. For example, a thread having a higher specified priority value or quantized priority value may be executed before a thread having a lower specified priority value or quantized priority value.

If two threads have substantially the same specified priority values, or quantized priority values, and are located in the same bucket, the threads may be processed based on their associated quantum values. In such a case, if a particular thread has a quantum value of five milliseconds (5 ms) and another thread has a quantum value of one millisecond (1 ms). The thread having a quantum value of five milliseconds will be allowed to execute for the five milliseconds, or until it is complete (whichever is less) and then, the thread having the quantum value of one millisecond will be allowed to run, or execute. In a particular aspect, with round robin scheduling, thread execution may continue to alternate between the two threads until one, or both, of the threads complete their respective work.

Figure 7:
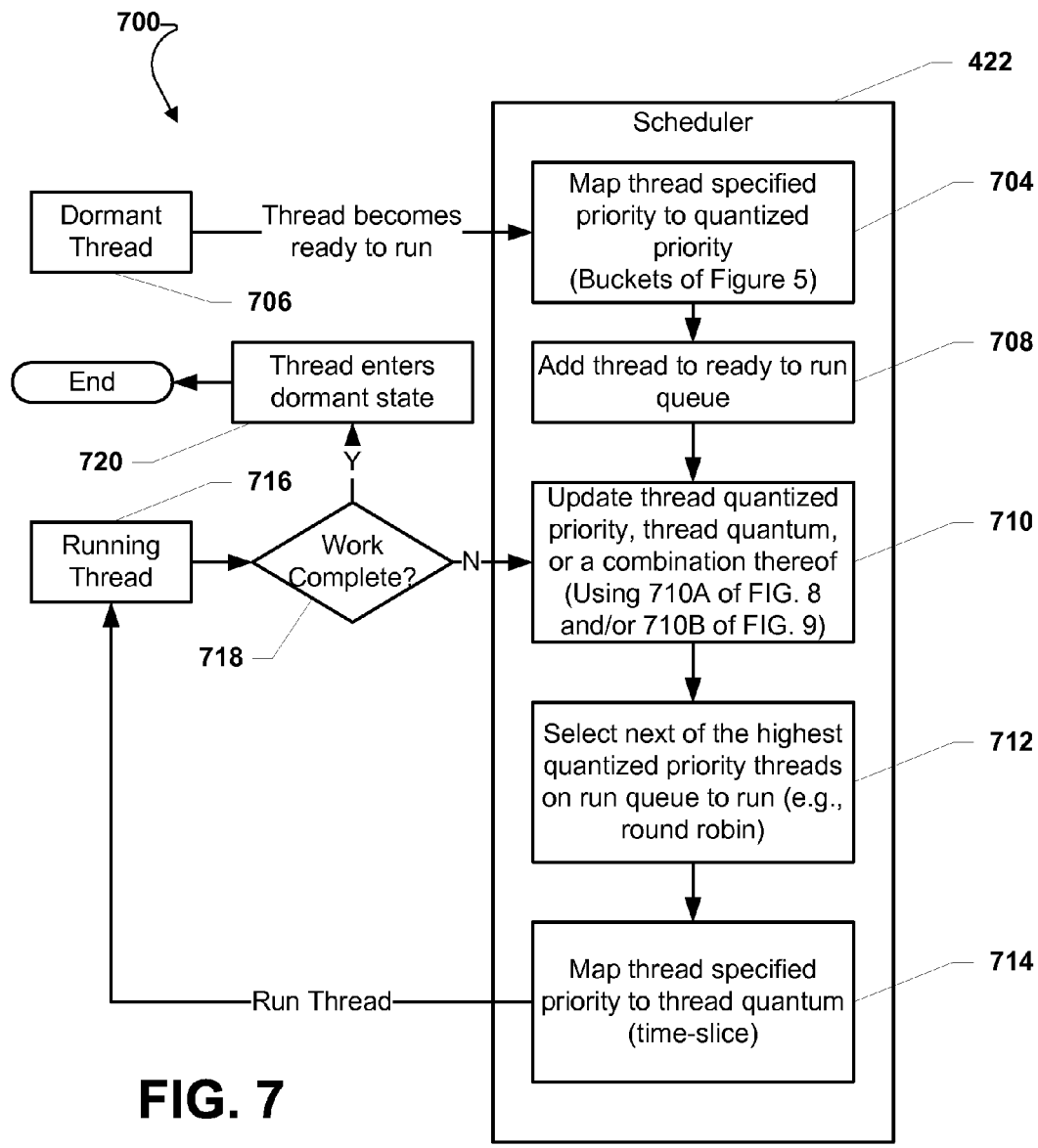
FIG. 7 is a flowchart illustrating a first aspect of a method of executing a plurality of threads.

Referring to FIG. 7, a method of executing a plurality of threads is shown and is generally designated 700. In a particular aspect, an operating system (OS) thread/process scheduler 422 may be modified in order to quantize the specified thread priority into a few discrete buckets 504, 506, 508. Each bucket may have a particular priority and all of the threads in a particular priority may be assigned the priority of the bucket. Further, each of the threads in a particular bucket may be run, or otherwise executed, by the scheduler 422 as if they were at the same priority. However, each thread in a particular bucket may also be assigned a scheduler quantum value, i.e., the maximum time-slice that a thread may run before being preempted by another thread in the same bucket. The scheduler 422 may further quantize the priority of the threads in each bucket based on a scheduler quantum value assigned to each thread.

For example, the scheduler 422 may place each thread in one of three buckets, e.g., a high priority bucket, an intermediate priority bucket, and a low priority bucket. Then, the priority of each thread within each bucket may be quantized to a scheduler quantum value. During execution, threads within a particular bucket may be executed before threads within another bucket, e.g., higher before intermediate and lower, intermediate before lower, etc. Threads within a particular bucket may be executed based on the specific scheduler quantum value of each thread.

Each thread may be a portion of a workload associated with a video application, an audio application, an email application, a wireless network application, a cellular network application, a short message service (SMS) application, a communication application, a security application, a calendar application, an instant messaging application, a still camera application, a global positioning system (GPS) application, a browser application, a memo pad application, a clock application, a game application, a calculator application, a banking application, a password keeper application, a help application, an ecommerce application, a software delivery application, a search application, an options application, a setup application, a telephone application, a connection management application, a security application, any other application, or a combination thereof.

Commencing at block 704, when a dormant thread 706 becomes ready to run, a scheduler 422 may map a thread specified priority value to a quantized priority value by creating three buckets with three different priorities. In a particular aspect, the quantized priority value may be determined based on the actual run time determined for a particular thread. In a particular aspect, the scheduler 422 may statically map the thread specified priority value to the quantized priority value, such as quantized map 580 of FIG. 5. In another aspect, the scheduler 422 may statically map the thread specified priority value to a quantum value, such as the quantum map 582 of FIG. 5.

In a particular aspect, a dormant thread 706 may be a thread that is not yet on a run queue, a thread that has just started to execute, or a combination thereof. At block 708, the scheduler 422 may add the thread to a ready to run queue. Further, at block 710, the scheduler 422 may update a thread quantized priority value, a thread quantum value, or a combination thereof. In a particular aspect, the scheduler 422 may update the thread quantized priority value, the thread quantum value, or a combination thereof statically, as described below by using the static update method 710A of FIG. 8 or the dynamic update method 710B of FIG. 9.

Moving to block 712, the scheduler 422 may select the next of the highest quantized priority value threads on the run queue to run, i.e., for execution at a processor. In a particular aspect, the scheduler 422 may select the next of the highest quantized priority value threads in a round robin manner. Otherwise, the scheduler 422 may make this selection in any other manner well known in the art. At block 714, the scheduler 422 may map the thread specified priority value to the thread quantum value, i.e., time-slice. Thereafter, the thread may be run, or otherwise executed, at a processor. The processor may be a single core CPU, a multi-core CPU, multiple single core CPUs, multiple multi-core CPUs, or a combination thereof.

Moving to decision 718, the scheduler 422 may determine whether the work associated with the running thread 716 is complete. If the work is not complete, the method 700 may return to block 710 and the method 700 may continue as described herein. At decision 718, if the work is complete, the method 700 may proceed to block 720 and the thread may enter a dormant state. Thereafter, the method 700 may end.

Figure 8:
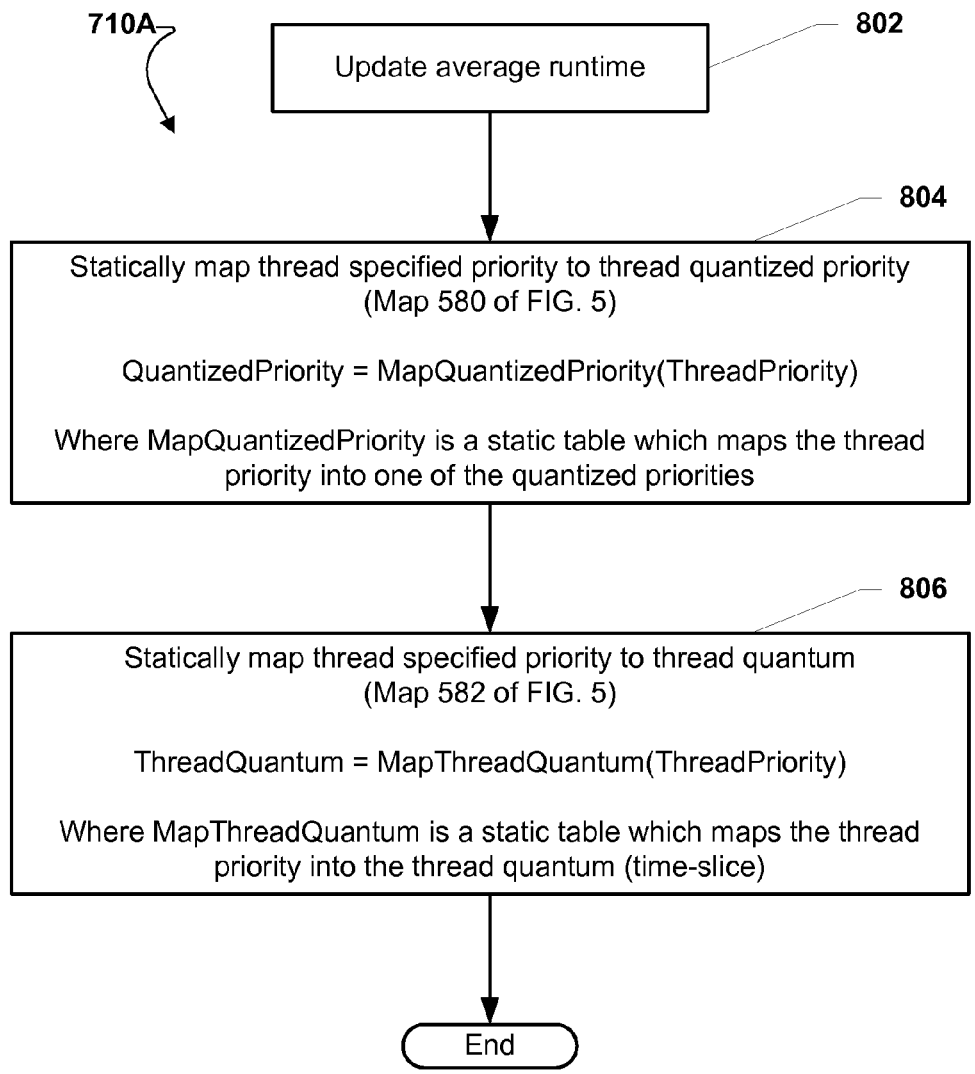
FIG. 8 is a flowchart illustrating a method of statically updating a thread priority quantization, a thread quantum value, or a combination thereof.

Referring to FIG. 8, a method 710A of statically updating a thread priority quantization, a thread quantum value, or a combination thereof is shown and is generally designated 710A. The method 710A shown in FIG. 8 may be executed by a scheduler 422 in order to update a thread priority quantization, a thread quantum value, or a combination thereof.

Beginning at block 802, the scheduler 422 may update an average runtime associated with a particular thread. At block 804, the scheduler 422 may statically map a thread specified priority value to a thread quantized priority value. In other words, a location in a quantized thread priority map (MapQuantizedPriority) 580 of FIG. 5 may be set equal to a quantized priority value associated with a thread.

In a particular aspect, the map quantized priority value may be a static table that maps the thread priority into one of the quantized priorities. Moving to block 806, the scheduler 422 may statically map a thread specified priority value to a thread quantum value. In other words, a location in a thread quantum value map (MapThreadQuantum value) 582 of FIG. 5 may be set equal to a thread quantum value associated with a thread. The MapThreadQuantum value may be a static table which maps the thread priority into the thread quantum value, i.e., time-slice. Thereafter, the method 710A may end.

Figure 9:
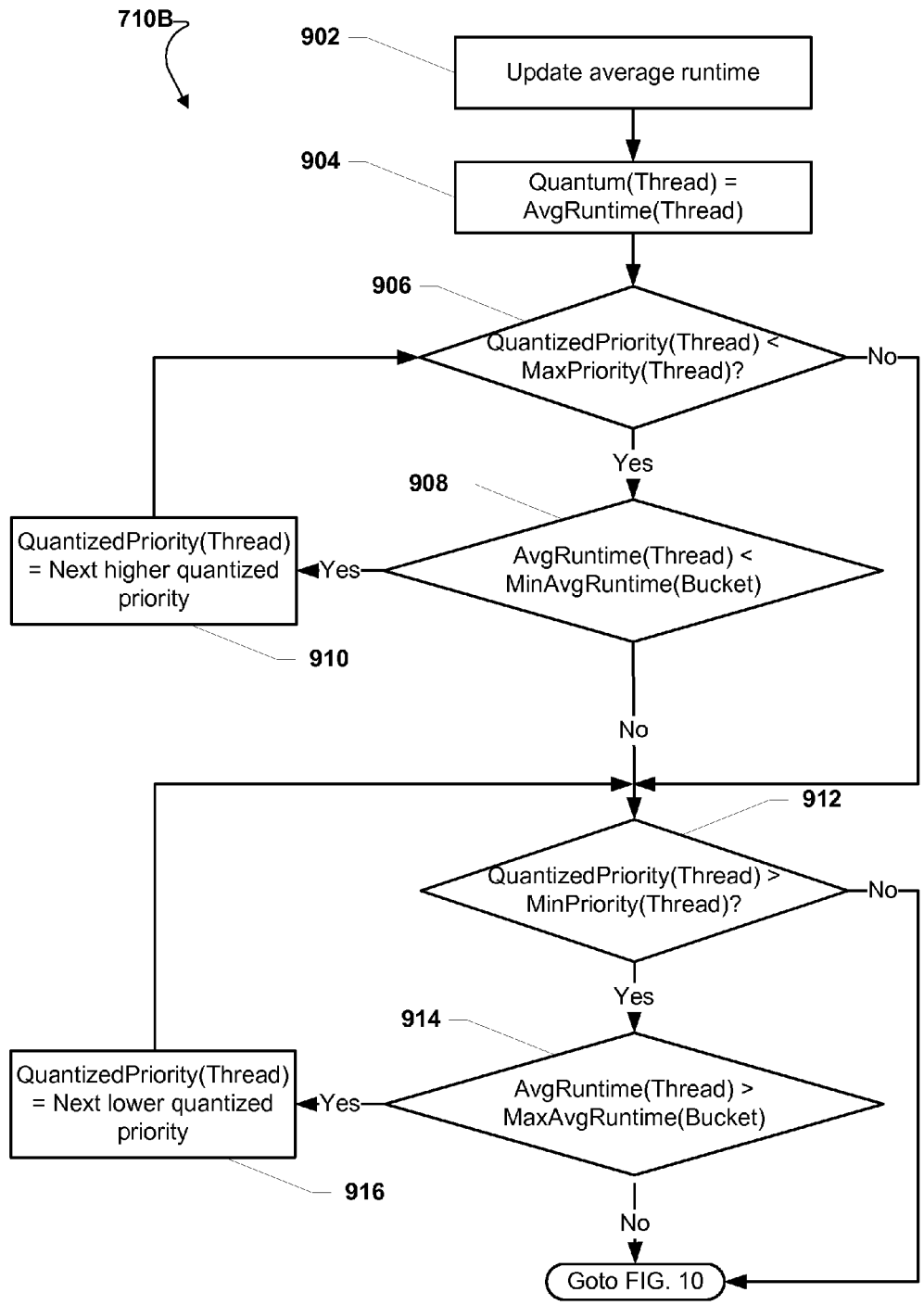
FIG. 9 is a flowchart illustrating a first portion of a method of dynamically updating a thread priority quantization, a thread quantum value, or a combination thereof.

FIG. 9 depicts a method 710B of dynamically updating a thread priority quantization, a thread quantum value, or a combination thereof is shown. The method is generally designated 710B. Further, the method 710B shown in FIG. 9 may be executed by a scheduler 422 in order to update a thread priority quantization, a thread quantum value, or a combination thereof.

Commencing at block 902, the scheduler 422 may update an average runtime associated with a particular thread. At block 904, the scheduler 422 may set a Quantum value(Thread) value equal to an AvgRuntime(Thread) value. The Quantum value(Thread) value may be a current quantum value associated with a thread. Further, the AvgRunTime (Thread) value may be an average amount of time that a thread runs between idle periods.

Moving to decision 906, the scheduler 422 may determine whether a QuantizedPriority(Thread) value is less than a MaxPriority(Thread) value, where the QuantizedPriority(Thread) value is a current quantized priority value associated with a thread and the MaxPriority(Thread) value is a maximum priority at which the thread should be run. If the QuantizedPriority(Thread) value is less than the MaxPriority(Thread) value, the method 710B may proceed to decision 908 and the scheduler 422 may determine whether the AvgRuntime(Thread) value is less than a MinAvgRuntime(Bucket) value, wherein the MinAvgRuntime(Bucket) value is a minimum average runtime that all threads in a particular bucket should maintain.

If the AvgRuntime(Thread) value is less than the MinAvgRuntime(Bucket) value, the method 710B may proceed to block 910 and the scheduler 422 may set the QuantizedPriority(Thread) value equal to a next higher quantized priority value, i.e., the thread is promoted to the next bucket in the sequence of buckets with a priority higher than the priority of the current bucket. Thereafter, the method 710B may return to decision 906 and the method 710B may continue as described herein. Returning to decision 908, if the AvgRuntime(Thread) value is not less than, i.e., greater than or equal to, the MinAvgRuntime(Bucket) value, the method 710B may proceed to decision 912. Further, returning to decision 906, if the QuantizedPriority(Thread) is not less than, i.e., greater than or equal to, the MaxPriority(Thread) value, the method 710B may also proceed to decision 912.

At decision 912, the scheduler 422 may determine whether the QuantizedPriority(Thread) value is greater than a MinPriority(Thread) value where the MinPriority(Thread) value is a minimum priority at which the thread should be run. If the QuantizedPriority(Thread) value is greater than the MinPriority(Thread) value, the method 710B may proceed to decision 914 and the scheduler 422 may determine whether the AvgRuntime(Thread) value is greater than a MaxAvgRuntime(Bucket) value, wherein the MaxAvgRuntime(Bucket) value is a maximum average runtime that all threads in a particular, i.e., current, bucket should maintain.

If the AvgRuntime(Thread) value is greater than the MaxAvgRuntime(Bucket) value, the method 710B may proceed to block 916 and the scheduler 422 may set the QuantizedPriority(Thread) value equal to a next lower quantized priority value, i.e., the thread is demoted to the next bucket in the sequence of buckets with a priority lower than the priority of the current bucket. Thereafter, the method may return to decision 912 and the method 710B may continue as described herein. Returning to decision 914, if the AvgRuntime(Thread) value is not greater than, i.e., less than or equal to, the MaxAvgRuntime(Bucket) value, the method 710B may proceed to decision 1002 of FIG. 10. Returning to decision 912, if the QuantizedPriority(Thread) is not greater than, i.e., less than or equal to, the MinPriority(Thread) value, the method 710B may also proceed to decision 1002 of FIG. 10.

Figure 10:
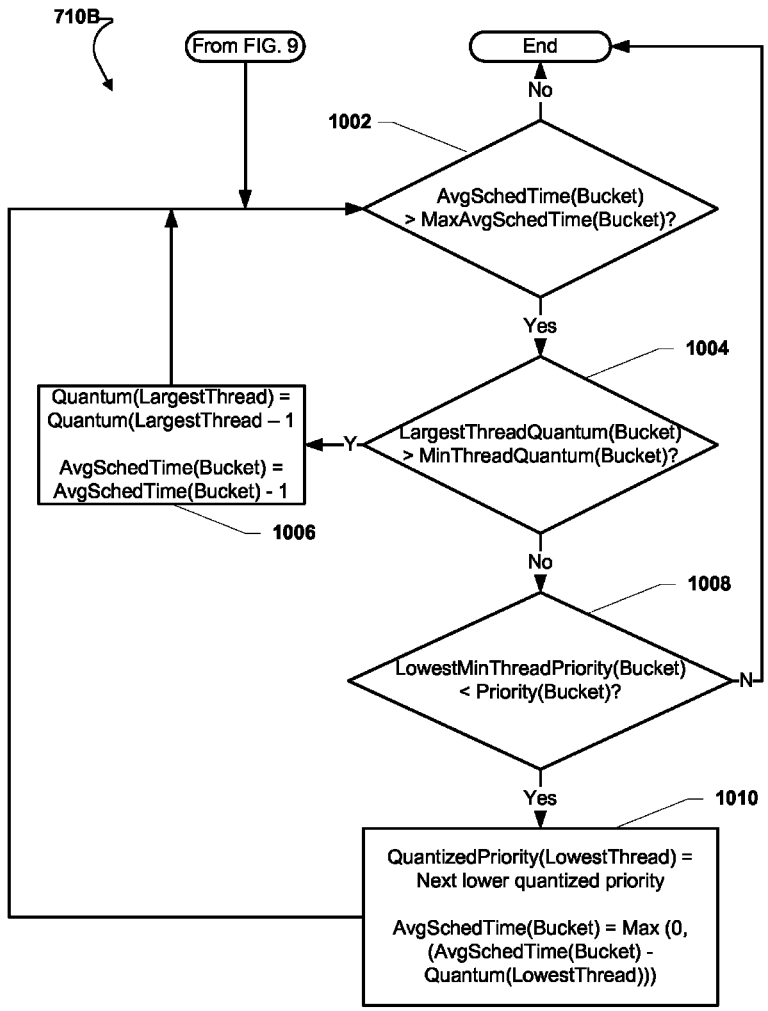
FIG. 10 is a flowchart illustrating a second portion of a method of dynamically updating a thread priority quantization, a thread quantum value, or a combination thereof.

At decision 1002 of FIG. 10, the scheduler 422 may determine whether an AvgSchedTime(Bucket) value is greater than a MaxAvgSchedTime(Bucket) value where the AvgSchedTime(Bucket) value is the average amount of time that it takes for a thread to start after being placed on the run queue when in a particular bucket and the MaxAvgSchedTime (Bucket) value may be a maximum average scheduling time that is desired for a particular bucket. In a particular aspect, the placement of a thread may be an initial placement or a replacement after the thread has run and exhausted its quantum value.

If the AvgSchedTime(Bucket) value is not greater than, i.e., less than or equal to, the MaxAvgSchedTime(Bucket) value, the method 710B may end. Otherwise, if the AvgSchedTime (Bucket) value is greater than MaxAvgSchedTime(Bucket) value, the method 710B may proceed to decision 1004 and the scheduler 422 may determine whether a LargestThreadQuantum value(Bucket) value is greater than a MinThreadQuantum value(Bucket) value, where LargestThreadQuantum value(Bucket) value is the largest quantum value for any thread in a particular bucket and the MinThreadQuantum value (Bucket) value is the minimum thread quantum value desired for any thread in a particular bucket. If the LargestThreadQuantum value(Bucket) value is indeed greater than the MinThreadQuantum value(Bucket) value, the method 710B may proceed to block 1006.

At block 1006, the scheduler 422 may reduce a Quantum value(LargestThread) value by one integer, where the Quantum value(LargestThread) value is a highest thread quantum value in a particular bucket. Further, at block 1006, the scheduler 422 may reduce the AvgSchedTime(Bucket) value by one integer. Thereafter, the method 710B may return to decision 1002 and the method 710B may continue as described herein.

Returning to decision 1004, if the LargestThreadQuantum value(Bucket) value is not greater than, i.e., less than or equal to, the MinThreadQuantum value(Bucket) value, the method 710B may proceed to decision 1008. At decision 1008, the method 710B may determine whether a LowestMinThreadPriority(Bucket) value is less than a Priority(Bucket) value, wherein the LowestMinThreadPriority(Bucket) value is the lowest minimum priority for any thread in a particular bucket and the Priority(Bucket) value is the priority of the particular bucket. If the LowestMinThreadPriority(Bucket) value is not less than, i.e., greater than or equal to the Priority(Bucket) value, the method 710B may end.

Conversely, if the LowestMinThreadPriority(Bucket) value is less than the Priority(Bucket) value, the method 710B may proceed to block 1010. At block 1010, the scheduler 422 may set a QuantizedPriority(LowestThread) value equal to a next lower quantized priority value, where LowestThread is the thread with the lowest minimum priority, i.e., the thread with the lowest minimum priority is demoted to the next bucket in the sequence of buckets with a priority lower than the priority of the current bucket. Further, at block 1010, the scheduler 422 may set the AvgSchedTime(Bucket) value equal to the maximum of zero or the AvgSchedTime(Bucket) value minus a Quantum value(LowestThread) value, where the Quantum value(LowestThread) value is the quantum value of the thread with the lowest minimum priority in the current bucket. Thereafter, the method 710B may return to decision 1002 and the method 710B may continue as described herein.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof. Further, the method steps described herein may be executed on a single core processor, a multicore processor, multiple single core processors, multiple multicore processors, or any combination thereof.

With the configuration described herein, the systems and methods may quantize thread priority into a small number of schedulable priorities and to the scheduler's quantum value (time-slice) for the thread. Further, the systems and methods may substantially eliminate the total starvation of a lower priority thread induced by a higher priory thread running continuously, when threads are quantized into the same effective priority. The systems and methods may also substantially reduce limit the maximum amount of time that a lower priority thread is starved due to the continuous execution of a higher priority thread, when threads are quantized into the same effective priority.

In a particular aspect, the systems and methods herein may substantially reduce the complexity of hunting down thread priority induced race-conditions and starvation, e.g., due to a reduced number of thread priorities. Moreover, the systems and methods described herein may allow threads with higher specified priorities to get an increased percentage of processing time without starvation of other threads while the thread is on the scheduler's run queue. The systems and methods herein may further allow a specified thread priority to be changed to increase a thread's CPU utilization without changing the effective priority and as such, may not lead to undesirable, or otherwise unexpected, starvation of other threads and/or race conditions.

In a particular aspect, the system and methods herein may substantially reduce thread starvation due to the reduction in the number of schedulable priority levels. By quantizing the specified priority value into fewer priorities and time-slicing each thread, total starvation, e.g., caused by the higher priority thread always running, may be substantially eliminated whenever threads of differing specified priorities are mapped onto the same quantized priority value. Further, by quantizing the specified priority value into fewer priorities and time-slicing each thread, the duration of starvation, e.g., caused by a higher priority thread always running, may be substantially reduced to a maximum of the accumulated time-slices of all the other threads mapped into the same quantized priority value and concurrently scheduled to run. In another aspect, by quantizing the specified priority value into fewer priorities, the likely hood of starvation and/or race conditions is substantially reduced, since the analysis required to ensure that such conditions do not exist is combinatorially dependent upon the number of priorities involved.

The system and methods described herein may allow threads with higher specified priorities to get more CPU time by mapping high priority threads to higher quantum values. In a particular aspect, the higher a thread quantum value, the longer the thread may run, or be executed, prior to being preempted. As such, the thread may have a potentially higher percentage of CPU utilization yet lower priority threads may be allowed to run. Further, by changing a thread specified priority value such that the thread quantized priority value remains the same does not change effective priorities of the threads and does not lead to a fundamental increase in deadlocks and/or race conditions.

In one or more exemplary aspects, the functions described may be implemented in hardware, software, firmware, or any combination thereof. If implemented in software, the functions may be stored on as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

What is claimed is:

1. A method for executing a plurality of threads, comprising:
    determining a thread quantized priority value for a first thread based on run time information associated with the first thread;
    assigning the first thread to one of a plurality of thread buckets, each of the plurality of thread buckets having a bucket priority value;
    mapping the thread quantized priority value to a thread specified priority value of the first thread;

mapping a quantum value associated with the first thread to the thread specified priority value, the quantum value identifying a maximum amount of time that the first thread is allowed to run before being preempted by a second thread;

adding the first thread to a ready to run queue;

selecting a thread from the plurality of threads to run from the ready to run queue based on the bucket priority value, mapped thread quantized priority value, and mapped quantum value;

running the selected thread in a processor of a computing device; and increasing the quantum value associated with the first thread in order to extend the maximum amount of time that the first thread is allowed to execute before being preempted by the second thread.

2. The method of claim 1, wherein determining the thread quantized priority value for the first thread based on run time information associated with the first thread comprises determining a priority value for the first thread based on an actual run time of the first thread.

3. The method of claim 1, further comprising:
determining whether the running of the selected thread in the processor of the computing device is complete; and
updating the thread quantized priority value and the quantum value when it is determined that running the selected thread in the processor of the computing device is complete.

4. The method of claim 3, wherein determining whether the running of the selected thread in the processor of the computing device is complete comprises determining whether work associated with the selected thread is complete.

5. The method of claim 1, wherein mapping the quantum value associated with the first thread to the thread specified priority value comprises using a quantum value map to statically map the quantum value associated with the first thread to the thread specified priority value.

6. The method of claim 1, wherein the quantum value associated with the first thread is expressed as a time value.

7. The method of claim 1, wherein the quantum value associated with the first thread is selected to have a higher quantum value than a quantum value associated with the second thread, the higher quantum value selected to provide the first thread more central processing unit (CPU) time than the second thread.

8. A device for executing a plurality of threads, the device comprising:
a processor;
means for determining a thread quantized priority value for a first thread based on run time information associated with the first thread;
means for assigning the first thread to one of a plurality of thread buckets, each of the plurality of thread buckets having a bucket priority value;
means for mapping the thread quantized priority value to a thread specified priority value of the first thread;
means for mapping a quantum value associated with the first thread to the thread specified priority value, the quantum value identifying a maximum amount of time that the first thread is allowed to run before being preempted by a second thread;
means for adding the first thread to a ready to run queue;
means for selecting a thread from the plurality of threads to run from the ready to run queue based on the bucket priority value, mapped thread quantized priority value, and mapped quantum value;
means for running the selected thread in the processor; and
means for increasing the quantum value associated with the first thread in order to extend the maximum amount of time that the first thread is allowed to execute before being preempted by the second thread.

9. The device of claim 8, wherein means for determining the thread quantized priority value for the first thread based on run time information associated with the first thread comprises means for determining a priority value for the first thread based on an actual run time of the first thread.

10. The device of claim 8, further comprising:
means for determining whether the running of the selected thread in the processor is complete; and
means for updating the thread quantized priority value and the quantum value when it is determined that running the selected thread in the processor is complete.

11. The device of claim 10, wherein means for determining whether the running of the selected thread in the processor is complete comprises means for determining whether work associated with the selected thread is complete.

12. The device of claim 8, wherein means for mapping the quantum value associated with the first thread to the thread specified priority value comprises means for using a quantum value map to statically map the quantum value associated with the first thread to the thread specified priority value.

13. The device of claim 8, further comprising means for expressing the quantum value associated with the first thread as a time value.

14. The device of claim 8, further comprising means for selecting the quantum value associated with the first thread to have a higher quantum value than a quantum value associated with the second thread, the higher quantum value selected to provide the first thread more central processing unit (CPU) time than the second thread.

15. A computing device, comprising:
a processor configured with processor-executable instructions to perform operations comprising:
determining a thread quantized priority value for a first thread based on run time information associated with the first thread;
assigning the first thread to one of a plurality of thread buckets, each of the plurality of thread buckets having a bucket priority value;
mapping the thread quantized priority value to a thread specified priority value of the first thread;
mapping a quantum value associated with the first thread to the thread specified priority value, the quantum value identifying a maximum amount of time that the first thread is allowed to run before being preempted by a second thread;
adding the first thread to a ready to run queue;
selecting a thread from the plurality of threads to run from the ready to run queue based on the bucket priority value, mapped thread quantized priority value, and mapped quantum value;
running the selected thread; and
increasing the quantum value associated with the first thread in order to extend the maximum amount of time that the first thread is allowed to execute before being preempted by the second thread.

16. The device of claim 15, wherein the processor is configured with processor-executable instructions to perform operations such that determining the thread quantized priority value for the first thread based on run time information associated with the first thread comprises determining a priority value for the first thread based on an actual run time of the first thread.

17. The device of claim 15, wherein the processor is configured with processor-executable instructions to perform operations further comprising:
  determining whether the running of the selected thread is complete; and
  updating the thread quantized priority value and the quantum value when it is determined that running the selected thread is complete.

18. The device of claim 17, wherein the processor is configured with processor-executable instructions to perform operations such that determining whether the running of the selected thread is complete comprises:
  determining whether work associated with the selected thread is complete.

19. The device of claim 15, wherein the processor is configured with processor-executable instructions to perform operations such that mapping the quantum value associated with the first thread to the thread specified priority value comprises using a quantum value map to statically map the quantum value associated with the first thread to the thread specified priority value.

20. The device of claim 15, wherein the processor is configured with processor-executable instructions to perform operations such that the quantum value associated with the first thread is expressed as a time value.

21. The device of claim 15, wherein the processor is configured with processor-executable instructions to perform operations further comprising selecting the quantum value associated with the first thread to have a higher quantum value than a quantum value associated with the second thread, the higher quantum value selected to provide the first thread more central processing unit (CPU) time than the second thread.

22. A non-transitory computer readable storage medium having stored thereon processor-executable software instructions configured to cause a processor to perform operations for executing a plurality of threads comprising:
  determining a thread quantized priority value for a first thread based on run time information associated with the first thread;
  assigning the first thread to one of a plurality of thread buckets, each of the plurality of thread buckets having a bucket priority value;
  mapping the thread quantized priority value to a thread specified priority value of the first thread;
  mapping a quantum value associated with the first thread to the thread specified priority value, the quantum value identifying a maximum amount of time that the first thread is allowed to run before being preempted by a second thread;
  adding the first thread to a ready to run queue;
  selecting a thread from the plurality of threads to run from the ready to run queue based on the bucket priority value, mapped thread quantized priority value, and mapped quantum value;
  running the selected thread; and
  increasing the quantum value associated with the first thread in order to extend the maximum amount of time that the first thread is allowed to execute before being preempted by the second thread.

23. The non-transitory computer readable storage medium of claim 22, wherein determining the thread quantized priority value for the first thread based on run time information associated with the first thread comprises determining a priority value for the first thread based on an actual run time of the first thread.

24. The non-transitory computer readable storage medium of claim 22, wherein the stored processor-executable software instructions are configured to cause a processor to perform operations further comprising:
  determining whether the running of the selected thread is complete; and
  updating the thread quantized priority value and the quantum value when it is determined that running the selected thread is complete.

25. The non-transitory computer readable storage medium of claim 24, wherein the stored processor-executable software instructions are configured to cause a processor to perform operations such that determining whether the running of the selected thread is complete comprises determining whether work associated with the selected thread is complete.

26. The non-transitory computer readable storage medium of claim 22, wherein the stored processor-executable software instructions are configured to cause a processor to perform operations such that mapping the quantum value associated with the first thread to the thread specified priority value comprises using a quantum value map to statically map the quantum value associated with the first thread to the thread specified priority value.

27. The non-transitory computer readable storage medium of claim 22, wherein the stored processor-executable software instructions are configured to cause a processor to perform operations such that the quantum value associated with the first thread is expressed as a time value.

28. The non-transitory computer readable storage medium of claim 22, wherein the stored processor-executable software instructions are configured to cause a processor to perform operations further comprising selecting the quantum value associated with the first thread to have a higher quantum value than a quantum value associated with the second thread, the higher quantum value selected to provide the first thread more central processing unit (CPU) time than the second thread.

* * * * *